Nov. 6, 1923.

E. O. BEARDSLEY 1,472,784

PORTABLE MOLDING MACHINE

Filed Oct. 13, 1922

3 Sheets-Sheet 1

Inventor
Elmer O. Beardsley
By Fred Gerlach
his Atty.

Nov. 6, 1923.                                                    1,472,784
                        E. O. BEARDSLEY
                     PORTABLE MOLDING MACHINE
                     Filed Oct. 13, 1922        3 Sheets-Sheet 2

Inventor:
Elmer O. Beardsley
By Fred Gerlach
his Atty

Nov. 6, 1923.  
E. O. BEARDSLEY  
1,472,784  
PORTABLE MOLDING MACHINE  
Filed Oct. 13, 1922  3 Sheets-Sheet 3

Inventor  
Elmer O. Beardsley  
By Fred Gerlach  
his Atty

Patented Nov. 6, 1923.

1,472,784

UNITED STATES PATENT OFFICE.

ELMER O. BEARDSLEY, OF CHICAGO, ILLINOIS, ASSIGNOR TO THE BEARDSLEY & PIPER COMPANY, OF CHICAGO, ILLINOIS, A CORPORATION OF ILLINOIS.

PORTABLE MOLDING MACHINE.

Application filed October 13, 1922. Serial No. 594,238.

*To all whom it may concern:*

Be it known that I, ELMER O. BEARDSLEY, a citizen of the United States, and a resident of Chicago, in the county of Cook and State of Illinois, have invented certain new and useful Improvements in Portable Molding Machines, of which the following is a full, clear and exact description.

The invention relates to portable molding machines.

In some foundries, it is not practicable to use a molding machine of the tractor type or those which are mounted on a wheeled carriage and adapted to travel on rails, and in others stationary machines cannot be used to advantage. For example, in making castings of unusual size, such as printing-press bases and frames, the patterns are placed in stationary pits and there is, in some instances, insufficient available space for the operation of a tractor, and the reach of a stationary machine is insufficient to fill such large molds. To meet these exigencies, it is desirable to have a molding machine which is portable so that it may be transported by a crane and set down in the molding room wherever it is desired or necessary in filling flasks, and one object of the present invention is to provide a molding machine which is so adapted.

A further object of the invention is to provide an improved machine which is adapted to retain itself rigid wherever it may be set on the molding room floor, without the necessity of providing means for attaching it in place.

A still further object of the invention is to provide means for levelling the molding machine, so that when it is set upon an irregular floor it may be easily and quickly set and retained, so that the line of projection of the sand will be in the correct direction for filling flasks beneath it.

The invention consists in the several novel features hereinafter set forth and more particularly defined by claims at the conclusion hereof.

Figure 1:
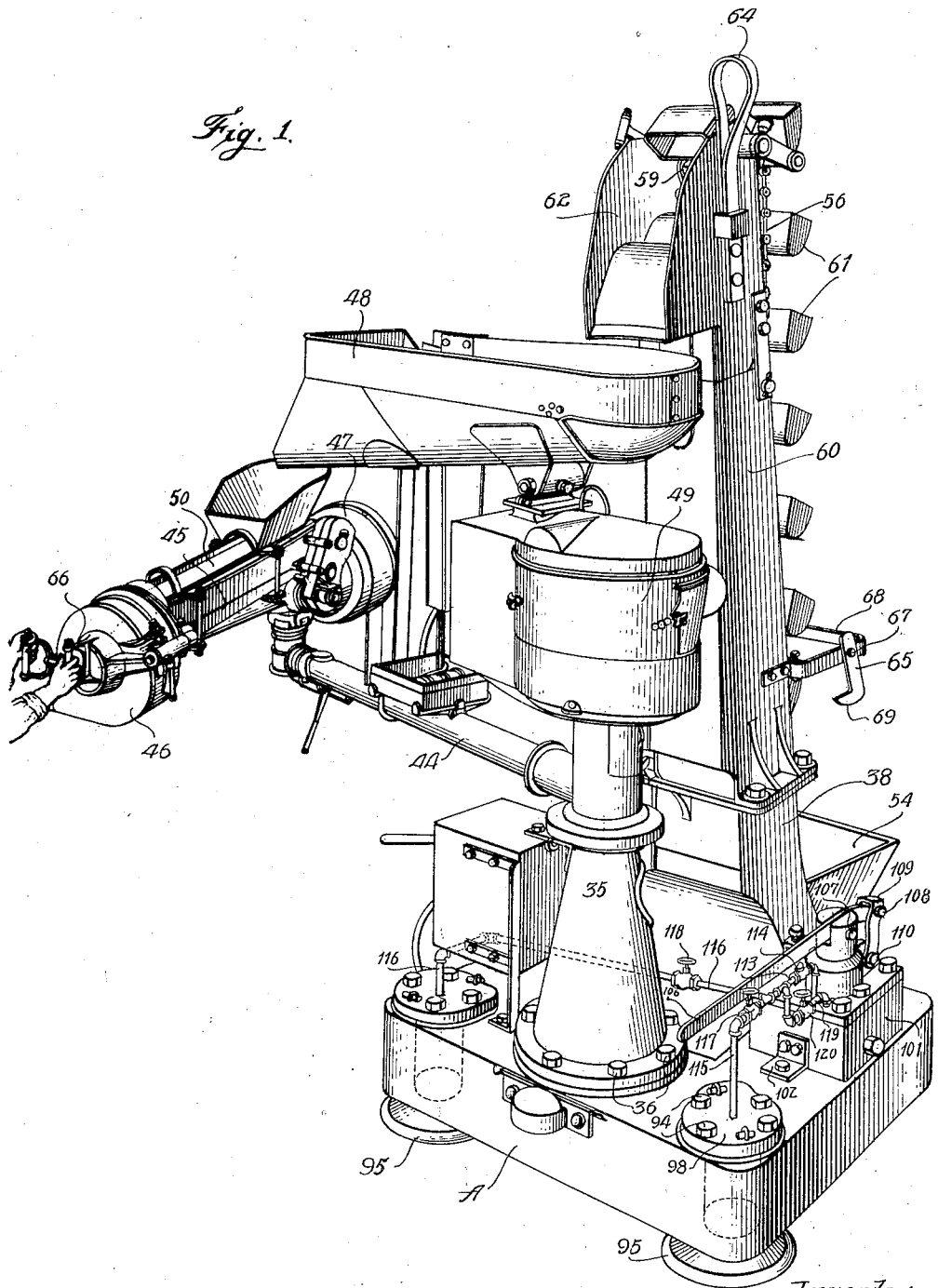
Figure 2:
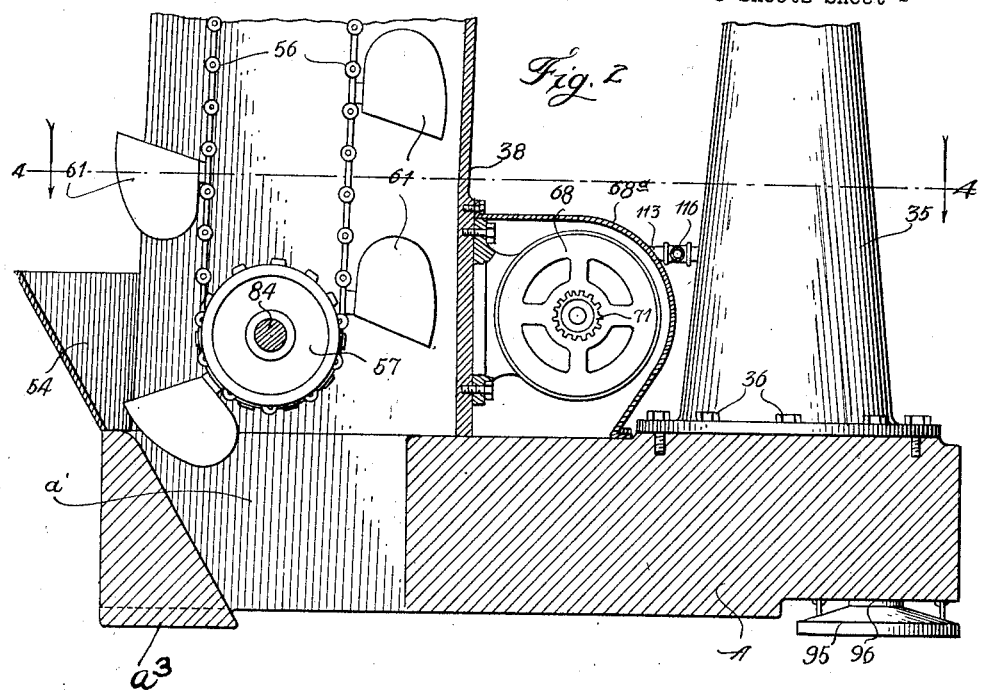
Figure 3:
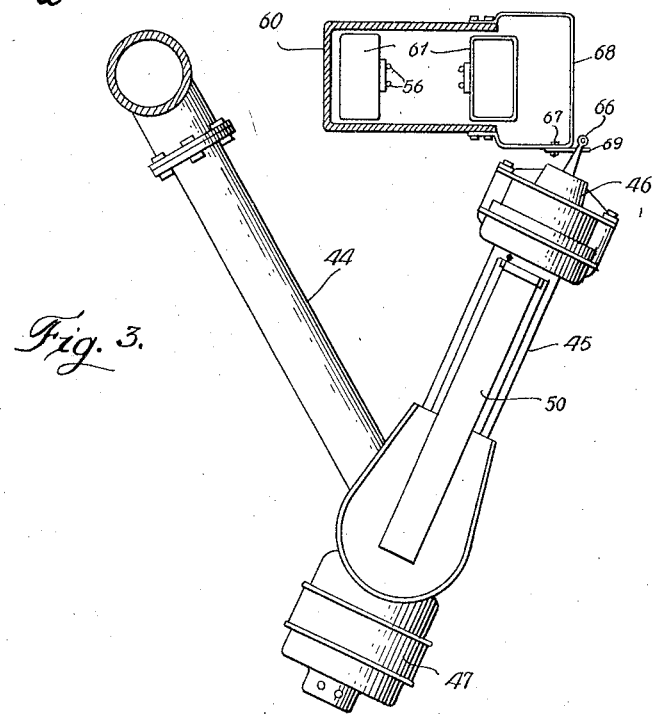
Figure 4:
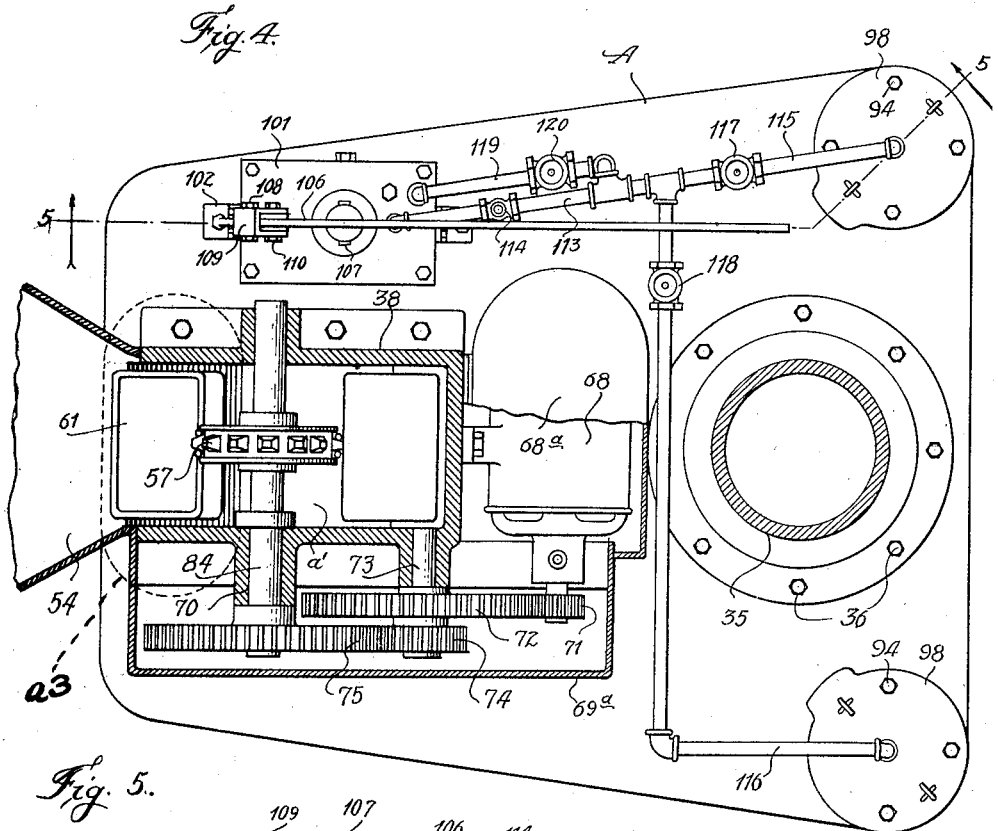
Figure 5:
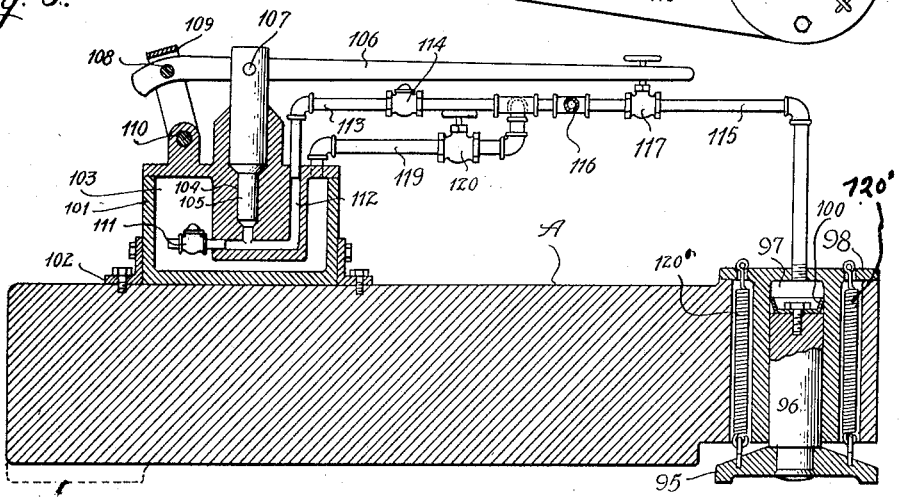

In the drawings: Fig. 1 is a perspective of a machine embodying the invention. Fig. 2 is a side elevation. Fig. 3 is a horizontal section. Fig. 4 is a section on line 4—4 of Fig. 3. Fig. 5 is a section on the line 5—5 of Fig. 4.

The invention is exemplified in a machine comprising a base A, which is adapted to rest on a molding room floor and is of sufficient weight to stationarily support the machine so it can be operated without attachment or anchorage to some permanent structure. A sand projector is mounted upon the base and is substantially of the construction illustrated and described in Patent No. 1,408,493, dated March 7, 1922, to which reference may be had for a more detailed description. The projector comprises a supporting standard 35 which is rigidly secured by bolts 36 to the top of the base A; a jib 44 pivoted to the staindard so as to swing horizontally; an arm 45 pivoted to the outer end of the jib 44 so as to swing horizontally relatively thereto; a sand-projector 46 mounted on the outer end of arm 45 and containing a rotor for projecting wads of sand downwardly at high speed; an electric motor 47 is also mounted to swing with arm 45 and connected to drive the rotor; a vibratory conveyor chute 48 containing a riddle mounted to swing with jib 44; a belt 50 mounted to swing with said arm and for feeding sand from said chute to the projector, and a case 49 containing mechanism including an electric motor for vibrating the chute. This mechanism exemplifies a sand projector which is carried by the base and which is movable laterally so as to discharge sand into all portions of flasks below the projector.

An elevator for sand comprises buckets 61 on an endless chain 56 which is driven by a lower sprocket 57 and passes around an idler sprocket 59. At its upper end, the buckets of this elevator dump sand into a guide 62 which directs it into the conveyor-chute 48. The upper end of the elevator is supported by a channelled column 60 which is secured at its lower end to a bracket 38 which is fixed to the top of base A. The sand-elevator is driven from an electric motor 68 which is fixedly mounted on the base, by a pinion 71 on the motor shaft, a gear 72 meshing with pinion 71, a pinion 74 fixed to rotate with gear 72 and mounted on a stud shaft 73, and a gear 75 meshing with pinion 74 and fixed to a cross-shaft 84 which is mounted in bearings 70 in bracket 38 and to which the driving sprocket 57 of the sand elevator is secured. A hopper 54 is secured to bracket 38 to direct sand shovelled into it to the elevator buckets 61. The base A is cut away, as at $a'$, to form a pocket around the lower end of the elevator. The bottom of this pocket is open, so that when the base is lifted off the floor, the sand therein will drop out. A case $68^a$ encloses motor 68 and a case $69^a$ encloses the gearing for driving the drive-shaft 84 for the elevator. The machine is provided with a suspension device 64 in the form of a loop located as near as possible to the center of gravity of the machine, whereby the entire machine, including its base, may be suspended from and lifted by an overhead crane with which the foundry is usually equipped. When it is desired to move the machine from one flask or place to another, the hook of the crane is slipped through the suspension loop 64 and the entire machine will be elevated and transported to the place desired. To prevent injury to the projector and its asssociated devices, a latch 65 is provided to slip through one of the handles 66 on the casing of the projector 46 so that the jib 44, arm 45 and projector 46 and the base carried thereby, will be locked against pivotal movement. Latch 65 is pivoted at 67 to a frame 68 which is secured to column 60. When the projector 46 is swung around to a point adjacent the elevator, the hook 69 on latch 65 will pass through the opening in handle 66 and engage the lower portion thereof and lock the projector and parts to which it is connected, against lateral displacement. As a result, during lifting and transporting of the machine, the parts will be folded into comparatively small space and locked so that they cannot swing outwardly and be damaged.

When a portable machine is used and it is necessary to set it in different portions of the foundry floor, it is seldom that the floor is sufficiently level to cause the machine to be set in a true upright position so that the line of projection of the sand by the projector will be vertical as desired for efficient filling of the flasks. To meet this condition, the base A is equipped with levelling mechanism or adjustable feet, so that when the machine is set where the floor is irregular, it can be properly and quickly levelled. This levelling mechanism comprises a pair of feet 95, one at each front corner of the base. Each foot is secured to a stem or piston 96 which is slidably mounted in a cylinder 97 which has a head 98 bolted at 94 to base A. Each stem is provided with packing 100 so that when fluid under pressure is forced into the cylinder, the fluid will lift the cylinder and the base A. The latter is narrowed and provided with a stationary foot as at its front end. By forcing fluid into either or both of the cylinders, the base may be levelled to overcome all irregularities in the floor.

Fluid, such as water or oil for operating the levelling mechanism, is contained in chamber 103 of box 101 which is rigidly secured by brackets 102 to the base. A hand-pump to force the liquid from chamber 101 into the cylinders 97 comprises a cylinder 104, a piston 105 working in said cylinder, a hand-lever 106 pivoted at 107 to the upper end of the piston 104 and fulcrumed at 108 on a link 109 which has its lower end pivoted at 110 to the top of box 101. Fluid from chamber 103 enters the pump-cylinder on its suction stroke through a check-valve 111 and piston 105 forces the fluid through a duct 112 to pipe 113. A check-valve 114 is included in the pipe 113 to prevent backflow of the fluid to the pump. A branch pipe 115 connects pipe 113 with one of the cylinders 97 and a branch pipe 116 connects pipe 113 with the other cylinder 97. A valve 117 is included in branch 115 and a similar valve 118 is included in branch 116, so that the supply of fluid under pressure to the cylinders may be separately controlled to permit one to be filled independently of the other, when necessary in levelling the machine. A return-pipe 119 is connected to supply-pipe 113 and to the fluid chamber 103 in box 101. A valve 120 is included in return-pipe 119 and is kept normally closed.

In operation, the pump lever 106 will be operated to force fluid into either or both of the cylinders 97. If, in order to level the machine, it is necessary to raise one side of the base only, the operator will close valve 118 and open valve 117 and operate the pump lever until that corner has been raised to the desired point. If it is necessary to raise the other side of the base where the other cylinder is located, valve 117 will be closed and valve 118 will be open. The pump will be operated to force fluid through pipe 116 into said cylinder. Whenever necessary, both of the cylinders may be raised by opening both of the valves 117 and 118 during the operation of the pump. The corners may be separately lowered by opening one or the other of valves 117 or 118 and valve 120 so that the fluid from either of the cylinders will return to chamber 103 in box 101. Springs 120' are applied to each foot 95 to retain them in their raised positions while the machine is suspended in mid air and to prevent the pistons 96 from dropping out of their cylinders respectively.

In operation, the projector 96 is operated to fill the flasks beneath it and within reach. The sand for keeping it supplied is shovelled into the hopper 54, from which it is elevated by buckets 61 which discharge the sand through guide 62 into the conveyor-chute 48 on jib 44. Chute 48 discharges the sand onto a belt 50 which delivers it to the casing of projector 46. Whenever it is necessary to move the machine to some other portion of the molding room, the projector 46 is swung around so that latch 65 will pass through handle 66 and lock it against horizontal rotation, so that arm 45, jib 44 and the parts carried thereby will be held in fixed relation to the base A and supporting standard 60. Next, the suspension loop 64 will be connected to an overhead crane, lifted off the ground and transported to the desired point of use where it will be lowered and set upon the floor. Then, the levelling mechanism will be operated to bring the machine into proper operative position.

The invention exemplifies a molding machine which is provided with a base which is adapted to maintain itself rigid wherever it may be set so that it will properly retain and support the operative parts of the molding machine. In practice, it has been found that a base, weighing approximately three tons is sufficient for this purpose. This provision makes it possible to have a machine which is operable while it is stationary and is readily transportable when desired, and in which securing or anchoring devices are dispensed with. The invention also exemplifies a machine of this character in which provision is made for quickly levelling the machine after it has been set in position.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a molding machine comprising a sand projector and mechanism for driving the projector, of a portable supporting base for said machine, adapted to retain itself and the machine therein, stationary wherever it is set on the floor.

2. The combination with a molding machine comprising a laterally movable sand projector and mechanism for driving the projector, of a portable supporting base for said machine, adapted to retain itself and the machine stationary wherever it is set on the floor.

3. The combination in a molding machine, of a sand projector, mechanism for driving the projector, a support, means for movably sustaining the projector from said support, and a portable supporting base on which said support is secured, adapted to retain itself and the support stationary wherever it is set on the floor.

4. The combination in a molding machine, of a sand projector, mechanism for driving the projector, a support, pivoted means for sustaining the projector from said support so the projector may be moved laterally, and a portable supporting base on which said support is secured, adapted to retain itself and the machine stationary wherever it is set on the floor.

5. The combination in a molding machine, of a sand projector, mechanism for driving the projector, means for movably supporting the projector, a portable supporting base on which the supporting means is secured adapted to retain itself stationary wherever it is set on the floor and means for delivering sand to the projector movable with said base.

6. The combination in a molding machine, of a sand projector, mechanism for driving the projector, means for movably supporting the projector, a portable base on which the supporting means is secured, adapted to retain itself stationary wherever it is set on the floor, an elevator for sand carried on said base.

7. The combination in a molding machine, of a sand projector, mechanism for driving the projector, means for movably supporting the projector, a portable base on which the supporting means is secured adapted to retain itself stationary wherever it is set on the floor, an elevator for sand carried on said base, and driving mechanism for the elevator including a motor supported by the base.

8. The combination of a molding machine comprising a sand projector and mechanism for driving the projector, a portable supporting base for the machine, adapted to retain itself and the machine stationary wherever it is set on the floor, and a suspension-device whereby the machine and base may be lifted.

9. The combination with a molding machine comprising a sand projector and mechanism for driving the projector, a portable supporting base for the machine adapted to retain itself stationary wherever it is set on the floor, a supporting column fixed to the base, and a suspension device whereby the machine may be lifted on the upper end of said column.

10. The combination of a molding machine comprising a driven sand projector and means to removably support the projector, a portable supporting base for the machine, adapted to retain itself in stationary position wherever it is set on the floor, and means for locking the projector against movement during transportation.

11. The combination of a molding machine comprising a driven sand projector and means to pivotally support the projector so it may be swung laterally, a portable supporting base for the machine, adapted to retain itself stationary wherever it is set on the floor, and means for locking the projector against movement during transportation.

12. The combination of a molding machine comprising a sand projector and mechanism for driving said projector, a portable base for the machine adapted to retain itself stationary wherever it is set on the floor and levelling mechanism for the base.

13. The combination of a molding machine comprising a sand projector and mechanism for driving said projector, a portable supporting base for the machine, adapted to retain itself stationary wherever it is set on the floor, and levelling mechanism for the base comprising feet and means to adjust the base on said feet.

14. The combination of a molding machine comprising a sand projector and mechanism for driving said projector, a portable supporting base for the machine, adapted to retain itself stationary wherever it is set on the floor, and levelling mechanism comprising devices separately operable by fluid under pressure.

15. The combination of a molding machine comprising a sand projector and mechanism for driving said projector, a portable supporting base for the machine, adapted to retain itself stationary wherever it may be set on the floor, and levelling mechanism comprising feet to rest on the floor, and devices separately operable by fluid under pressure.

16. The combination of a molding machine comprising a sand projector and mechanism for driving said projector, a portable supporting base for the machine, adapted to retain itself stationary wherever it is set on the floor, and levelling devices comprises a pluralty of pistons and cylinders, a pump, and means for separately controlling the delivery of fluid from the pump to said cylinders.

17. The combination with a molding machine comprising a sand projector and mechanism for driving said projector, a portable supporting base for the machine adapted to retain itself stationary wherever it is set on the floor, and levelling devices comprising a plurality of feet, a piston and cylinder for each foot, a pump, and means for separately controlling the delivering of fluid from the pump to said cylinders.

Signed at Chicago, in the county of Cook and State of Illinois, this 25th day of September, 1922.

ELMER O. BEARDSLEY.